(12) United States Patent
Shen et al.

(10) Patent No.: US 10,297,881 B2
(45) Date of Patent: May 21, 2019

(54) BATTERY HEATING SYSTEM, BATTERY ASSEMBLY AND ELECTRIC VEHICLE

(71) Applicant: BYD COMPANY LIMITED, Shenzhen, Guangdong (CN)

(72) Inventors: Xi Shen, Guangdong (CN); Wenfeng Jiang, Guangdong (CN); Jin Liu, Guangdong (CN); Xiaohui Jia, Guangdong (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 316 days.

(21) Appl. No.: 15/384,206

(22) Filed: Dec. 19, 2016

(65) Prior Publication Data

US 2017/0098874 A1     Apr. 6, 2017

Related U.S. Application Data

(63) Continuation of application No. PCT/CN2015/078799, filed on May 12, 2015.

(30) Foreign Application Priority Data

Jun. 30, 2014    (CN) .......................... 2014 1 0309474

(51) Int. Cl.
*H01M 10/615*    (2014.01)
*H01M 10/42*    (2006.01)
(Continued)

(52) U.S. Cl.
CPC ...... *H01M 10/615* (2015.04); *B60H 1/00278* (2013.01); *B60L 58/26* (2019.02);
(Continued)

(58) Field of Classification Search
USPC ......................................................... 320/150
See application file for complete search history.

(56) References Cited

U.S. PATENT DOCUMENTS 5,834,131 A * 11/1998 Lutz ...................... G05D 23/00
429/7
6,392,388 B1    5/2002 Young
(Continued)

FOREIGN PATENT DOCUMENTS

CN    201397868 Y    2/2010
CN    102324591 A    1/2012
(Continued)

OTHER PUBLICATIONS

International Search Report and Written Opinion for Application No. PCT/CN2015/078799, dated Aug. 3, 2015, 6 pages.

*Primary Examiner* — Robert J Grant
(74) *Attorney, Agent, or Firm* — Sheppard Mullin Richter & Hampton LLP

(57) ABSTRACT

Embodiments of the present disclosure provide a battery heating system, a battery assembly and an electric vehicle. The battery heating system includes: a battery group having a positive terminal and a negative terminal; a switch having a first end connected with the positive terminal; a large-current discharge module, and a controller connected to the switch and configured to control the switch according to a temperature of the battery group. A first end of the large-current discharge module is connected to a second end of the switch, and a second end of the large-current discharge module is connected to the negative terminal. When the switch is turned on, the battery group discharges via the large-current discharge module and the battery group is heated due to an internal resistance thereof.

17 Claims, 2 Drawing Sheets

(51) Int. Cl.
  *H01M 10/625* (2014.01)
  *H01M 10/6571* (2014.01)
  *B60H 1/00* (2006.01)
  *H01M 10/44* (2006.01)
  *H01M 10/48* (2006.01)
  *B60L 58/26* (2019.01)
  *B60L 58/27* (2019.01)
  *B60K 1/00* (2006.01)

(52) U.S. Cl.
  CPC ......... *B60L 58/27* (2019.02); *H01M 10/4207* (2013.01); *H01M 10/443* (2013.01); *H01M 10/486* (2013.01); *H01M 10/625* (2015.04); *H01M 10/6571* (2015.04); *B60K 2001/005* (2013.01); *B60K 2001/006* (2013.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 8,252,470 B2 | 8/2012 | Ishikawa | |
| 8,280,572 B2 | 10/2012 | Takahashi | |
| 8,836,288 B2 | 9/2014 | Xu | |
| 9,231,425 B2 | 1/2016 | Lee | |
| 2005/0133215 A1 | 6/2005 | Ziehr | |
| 2005/0196662 A1 | 9/2005 | Prema | |
| 2006/0220620 A1* | 10/2006 | Aradachi | H02J 7/0091 320/150 |
| 2008/0251235 A1 | 10/2008 | Zhou | |
| 2009/0253028 A1 | 10/2009 | Takagi | |
| 2010/0167149 A1 | 7/2010 | Ishikawa | |
| 2010/0237059 A1* | 9/2010 | Porterfield | H05B 3/16 219/482 |
| 2011/0052944 A1 | 3/2011 | Matthias | |
| 2012/0123626 A1 | 5/2012 | Takahashil et al. | |
| 2012/0161711 A1 | 6/2012 | Xu | |
| 2012/0176082 A1 | 7/2012 | Lee | |
| 2013/0106357 A1* | 5/2013 | Girard | B60L 11/1864 320/126 |
| 2013/0280564 A1 | 10/2013 | Zheng | |

FOREIGN PATENT DOCUMENTS

| | | |
|---|---|---|
| CN | 102470772 A | 5/2012 |
| CN | 102742068 A | 10/2012 |
| CN | 202641415 U | 1/2013 |
| CN | 103051026 A | 4/2013 |
| CN | 103457318 A | 12/2013 |
| JP | 1126032 A | 1/1999 |
| JP | H1126032 A | 1/1999 |
| JP | 2004063397 A | 2/2004 |
| JP | 2008204764 A | 9/2008 |
| JP | 2010097923 A | 4/2010 |
| JP | 2010238553 A | 10/2010 |
| JP | 2011129429 A | 6/2011 |
| JP | 2011217487 A | 10/2011 |
| JP | 2012080630 A | 4/2012 |
| KR | 1020130107354 A | 10/2013 |
| KR | 1020140011445 A | 1/2014 |
| KR | 1020140075077 A | 6/2014 |

* cited by examiner

BATTERY HEATING SYSTEM, BATTERY ASSEMBLY AND ELECTRIC VEHICLE

CROSS-REFERENCE TO RELATED APPLICATION

This application is a continuation application of International Application No. PCT/CN2015/078799, filed on May 12, 2015, which is based on and claims priority to and benefits of Chinese Patent Application No. 201410309474.4, filed with State Intellectual Property Office on Jun. 30, 2014. The entire contents of the above-referenced applications are incorporated herein by reference.

FIELD

The present disclosure generally relates to a battery heating field, especially relates to a battery heating system, a battery assembly and an electric vehicle.

BACKGROUND

In the related art, heating a battery group is achieved by arranging a plurality of silicone heating wires between single batteries. A relay is connected between the silicon heating wires in series and used as a switch, and two ends of each silicon heating wire are connected to a positive terminal and a negative terminal of the battery respectively. As shown in FIG. 1, the battery heating system in the related art includes a battery group, a main circuit switch 2', a main circuit relay 3', a protect circuit 4', a relay 5' and a heating wire 6'.

When the vehicle needs to be started, the main circuit switch 2' is turned on, the protect circuit 4' starts to work, and an environment temperature is determined by a temperature measuring device of the protect circuit 4'. When the environment temperature is less than a predetermined temperature, the relay 5' is switched on, and the battery group discharges via the silicon heating wire 6' with a low current. At this time, the silicon heating wire 6' is working to generate heat so as to heat the battery group. When the temperature of the battery group reaches the predetermined temperature, the relay 5' is switched off, the main circuit relay 3' is switched on, and a vehicle control dial shows that the vehicle can be started. During running process of the vehicle, the battery group discharges and generates heat at the same time, and thus the environment temperature may be maintained at a required temperature, which solves the problem that a discharging efficiency of the battery group is low when the battery group is used in a relatively low environment temperature. When the battery group needs to be charged, the main circuit switch 2' is turned on, and the protect circuit 4' starts to work. When the environment temperature is less than the predetermined temperature, the relay 5' is switched on, and the battery group discharges via the silicon heating wire 6' with a low current, thus increasing the environment temperature. When the environment temperature reaches the predetermined requirement, the relay 5' is switched off, the main circuit relay 3' is switched on, and the battery group is charged. During the charging process, the battery group 1' also generates heat, and thus the environment temperature may be maintained at a required temperature. Thus, a potential safety risk due to low environment temperature when the battery group is charged may be avoided.

However, there are at least following disadvantages in the related art: first, since the battery group discharges to the silicon heating wire with a low current, a heating power is relatively low; secondly, since the silicon heating wire heats a surrounding environment of the battery group so as to heat the battery group, the heat is generated outside of the battery group, and then gradually transmitted into the battery group. In conclusion, the battery group is heated under a very low heating speed, which usually needs several hours to heat the battery group, and thus it cannot meet requirements of users, especially those who want to use the vehicle or charge the vehicle immediately.

In addition, Chinese patent application No. 201010271405.0 discloses a battery heating method, in which a voltage or current is applied to the battery, and when the voltage of the battery is lower than a lower limit, the positive terminal and negative terminal of the battery are connected with each other via a load resistor, and the battery is heated through a discharge current. However, this method is achieved with the help of a charger, that is, the heating device disclosed in Chinese patent application No. 201010271405.0 is used as a part of the charger, the heating device is externally disposed, and the battery is heated before it is charged. Therefore, the battery could not be heated anytime and anywhere. That is, the battery must be connected to the charger, for example, a charging post, if the battery needs to be heated. Furthermore, the load resistor only can be connected with the battery via a charging port, which limits the heating current, and thus the battery cannot be heated quickly.

SUMMARY

Embodiments of the present disclosure seek to solve at least one of the problems existing in the prior art to at least some extent.

According to a first broad aspect of present disclosure, there is provided a battery heating system, including: a battery group having a positive terminal and a negative terminal; a switch having a first end connected with the positive terminal; a current discharge module, and a controller connected to the switch and configured to control the switch according to a temperature of the battery group. A first end of the current discharge module is connected to a second end of the switch, and a second end of the current discharge module is connected to the negative terminal. When the switch is turned on, the battery group discharges via the current discharge module and is heated due to an internal resistance thereof.

According to the battery heating system of the present disclosure, with the current discharge module, the battery group discharges with a relatively large current, and thus the battery group may generate lots of heat within a short time due to an internal resistance thereof. That is, the battery group is heated from the inside thereof, and thus the battery group may be heated quickly. Specifically, since the discharge current is relatively large, and the battery group is heated from the inside thereof, a heating speed is high, and a heating efficiency is high, which may meet requirements of users.

According to a second broad aspect of present disclosure, there is provided a battery assembly, including the battery heating system mentioned above. With the battery assembly, the battery group may be quickly heated, thus reducing a heating time and improving a heating efficiency.

According to a third broad aspect of present disclosure, there is provided an electric vehicle, which includes: a motor; an air-conditioner system; and a battery assembly mentioned above. With the electric vehicle, the battery group may be quickly heated, thus reducing a heating time and improving a heating efficiency. If the temperature of the battery group is low before the electric vehicle is started or charged, the battery group may be quickly heated, thus saving a preparation time before the electric vehicle is started or charged.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The disclosure is illustrated in the accompanying drawings, in which.

DETAILED DESCRIPTION

Figure 1:
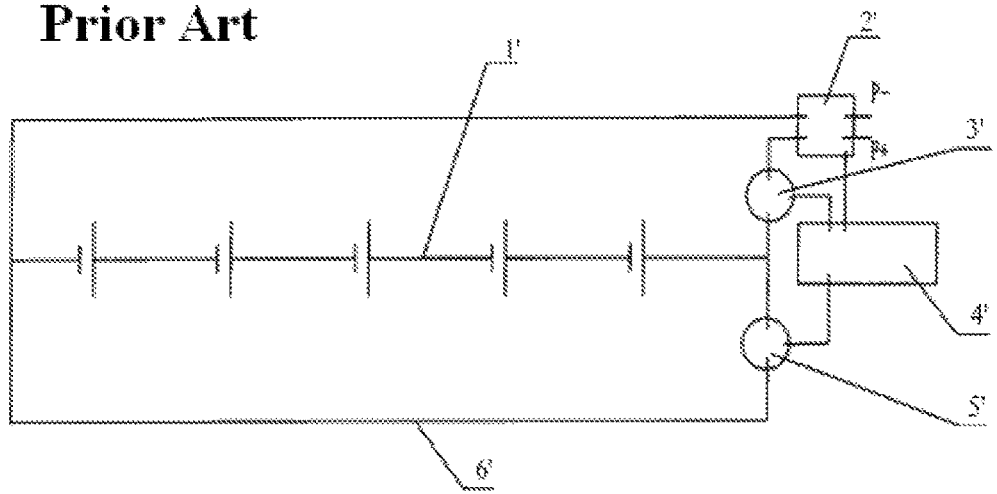
FIG. 1 is a schematic view of a battery heating system in the related art.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "longitudinal", "lateral", "front", "rear", "right", "left", "lower", "upper", "vertical", "above", "below", "up", "top", "bottom" as well as derivative thereof (e.g., "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. Those having ordinary skills in the art should understand the specific meanings in the present disclosure according to specific situations.

Figure 2:
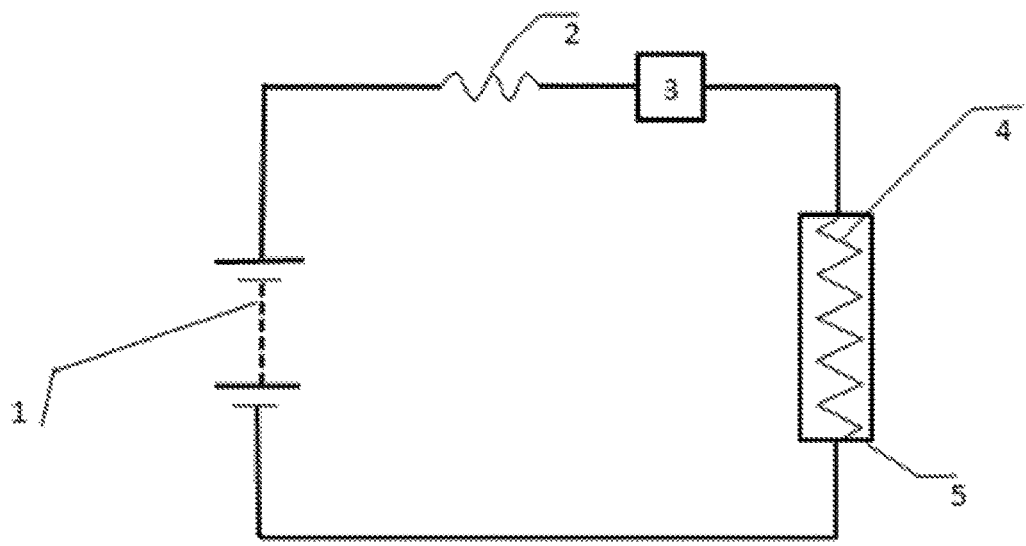
FIG. 2 is a schematic view of a battery heating system according to one embodiment of the present disclosure.

FIG. 2 shows a schematic view of a battery heating system according to one embodiment of the present disclosure. As shown in FIG. 2, the battery heating system includes: a battery group 1, a switch 3, a current discharge module 4 and a controller (not shown). In some embodiments, the current discharge module 4 discharges a relatively large current, and is also called a large-current discharge module.

A first end of the switch 3 (a left end of the switch 3 as shown in FIG. 2) is connected with a positive terminal of the battery group 1. In some embodiments, the switch 3 includes an insulated gate bipolar transistor (IGBT). It should be noted that the switch 3 could be other kinds of switch known by those skilled in the art. A first end of the large-current discharge module 4 (an upper end of the large-current discharge module 4 shown in FIG. 2) is connected to a second end of the switch 3 (a right end of the switch 3 shown in FIG. 2), and a second end of the large-current discharge module 4 (a lower end of the large-current discharge module 4 shown in FIG. 2) is connected to a negative terminal of the battery group 1. The controller is connected to the switch 3 and configured to control the switch 3 according to a temperature of the battery group 1. When the switch 3 is turned on, the battery group 1 discharges via the large-current discharge module 4 and at the same time, the battery group 1 is heated due to an internal resistance in itself.

In some embodiments of the present disclosure, the large-current discharge module 4 may have a discharge current of about 400 A to about 500 A. In one embodiment, the large-current discharge module 4 includes a metal heating wire, for example, a nickel-chromium alloy heating wire. In some embodiments, the metal heating wire may have an electrical resistivity of about $(1.14 \pm 0.05) \times 10^{-6}$ $\Omega$*m.

In embodiments of the present disclosure, the large-current discharge module 4, for example, a metal heating wire, is directly connected between the positive terminal and negative terminal of the battery group 1, so as to generate a loop current, and thus the battery group 1 is self-heated via the internal resistance thereof.

The impedance of the battery group 1 at a low temperature (such as −30 degrees Celsius) may be greatly higher than that of the battery group 1 at a normal temperature or a high temperature, that is, the internal resistance of the battery group 1 at the low temperature is greatly higher than that of the battery group 1 at the normal temperature or the high temperature. Therefore, when the battery group is enabled at the low temperature, the positive terminal and the negative terminal of the battery group 1 are directly connected via the large-current discharge module 4 (such as the metal heating wire), and since the battery group 1 has a large internal resistance at this time, the battery group 1 may have a large voltage drop, and then the battery group 1 may be self-heated due to the internal resistance thereof. If the positive terminal and the negative terminal of the battery group 1 are directly connected via a metal heating wire at the normal temperature, it may result in a short circuit, and thus the battery group 1 may be destroyed.

In one embodiment, the nickel-chromium alloy heating wire has a predetermined electrical resistivity, a predetermined resistance value and a predetermined diameter. The predetermined electrical resistivity may be obtained by regulating a ratio of nickel to chromium, the predetermined resistance value may be obtained according to the impedance of the battery group 1 and the heating current of the battery group 1, and the predetermined diameter may be obtained according to a discharge capacity and a heating time.

The electrical resistivity of the nickel-chromium alloy heating wire may reach a best value depending on a composition proportion of nickel and chromium. The best value of the electrical resistivity of the nickel-chromium alloy heating wire may be obtained according to experiments or experience. The resistance of the nickel-chromium alloy heating wire may be determined according to the impedance of the battery group 1 and the discharge current required for heating the battery group 1. The diameter of the nickel-chromium alloy heating wire may be determined according to a discharge capacity of the discharge circuit and a heating time. Then the volume of the nickel-chromium alloy heating wire may be comparatively ideal, when the battery heating system goes wrong, for example, such as when the switch 3 cannot be turned off normally, the nickel-chromium alloy heating wire may be fused after being heated for a certain time, so as to protect the battery heating system. Thus, the battery heating system may be safe and reliable.

When the switch 3 is turned on, the battery group 1 and the large-current discharge module 4 form the discharge circuit, and the total resistance of the discharge circuit changes with an increment of the temperature of the battery group 1, that is, the internal resistance of the battery group 1 and the resistance of the large-current discharge module 4 changes along with the temperature, also, the current in the discharge circuit changes along with the temperature. In order to prevent the battery group 1 and the large-current discharge module 4 from being destroyed due to an over-large current, the discharge current in the discharge circuit should be controlled. Therefore, in one embodiment, the battery heating system further includes an adjustable resistor (not shown) connected to the large-current discharge module 4 in series and a current detecting module (not shown) configured to detect a heating current of the battery group 1. The controller is further configured to adjust a resistance of the adjustable resistor so as to adjust the heating current of the battery group 1. For example, by adjusting the resistance of the adjustable resistor, the total resistance of the discharge circuit may remain the same or may change slightly, which makes the heating current (namely the discharge current) in the discharge circuit maintain within a relatively reasonable range, thus protecting the battery group 1 and the large-current discharge module 4. In addition, by controlling the discharge current in the discharge circuit, a stability and reliability of the battery group 1 may be improved.

In some embodiments of the present disclosure, the battery heating system may further include a sealed container 5, and cooling liquid received in the sealed container 5. The large-current discharge module 4 and the adjustable resistor are dipped in the cooling liquid, and the cooling liquid is configured to cool the large-current discharge module 4 and the adjustable resistor. Since the battery group 1 discharges with a large current, lots of heat may be generated by the large-current discharge module 4 and the adjustable resistor during the discharging, which may result in a over-high temperature of the large-current discharge module 4 and the adjustable resistor, and may decrease a heating efficiency of the battery heating system. With the sealed container 5 and the cooling liquid, the large-current discharge module 4 and the adjustable resistor could be cooled down, then the large-current discharge module 4 and the adjustable resistor may be prevented from being destroyed due to high temperature and a heating efficiency of the battery heating system may be increased.

In some embodiments of the present disclosure, the sealed container 5 is made of non-conducting material. For example, in one embodiment, the sealed container 5 is made of plastic material. Since a cost of plastic material is relatively lower, a cost of the battery heating system may be reduced. Besides, the cooling liquid may generally be conductive, with the sealed container 5 made of non-conductive material, an insulation performance may be improved, and thus a safety performance of the battery heating system may be improved.

In addition, a volume of the sealed container 5 and a volume of the cooling liquid may be regulated depending on actual needs. That is, the size (namely, volume) and shape of the sealed container 5 may be regulated according to the size and shape of the large-current discharge module 4, then material consumption of the sealed container 5 may be reduced as much as possible, and also the sealed container 5 is big enough to receive the large-current discharge module 4.

A metal heating wire (for example, the nickel-chromium alloy heating wire) is connected between the positive terminal and the negative terminal of the battery group 1, the metal heating wire is dipped into the cooling liquid, and an IGBT is used as the switch 3 to control the circuit to turn on or off. If the cooling liquid is conductive, the metal heating wire may be subjected to an insulating treatment. Refer to FIG. 2, when the switch 3 is turned on, the battery group 1 discharges with a relatively large current. Since the battery group 1 has a relatively high internal resistance, the battery group 1 could be heated due to the internal resistance thereof, and thus a temperature of the battery group 1 may be increased quickly. The metal heating wire is actually used as a load resistor, and the metal heating wire may not provide heat to the battery group 1 directly. However, the metal heating wire may have a very high heating power, therefore, in some embodiments, the metal heating wire is dipped in the cooling liquid to be cooled down, and the cooling liquid is heated.

In embodiments of the present disclosure, the battery group 1 discharges in a relatively large current, which is usually is higher than 10 C, and thus the temperature of the battery group 1 may be quickly increased. For example, heating the battery group 1 may be finished within 30 seconds. In order to obtain a relatively large current, the metal heating wire may be selected according to a standard of the battery group 1.

In some embodiments, the large-current discharge module 4 includes a nickel-chromium alloy heating wire. The nickel-chromium alloy heating wire has a great high-temperature strength, and the nickel-chromium alloy heating wire won't become brittle when being cooled down after a long time usage. Also, the nickel-chromium alloy heating wire has a high emission rate, no magnetism and a good corrosion resistance, and the nickel-chromium alloy heating wire is easy to dissipate heat.

In embodiments of the present disclosure, the nickel-chromium alloy includes about 15% to about 31% by weight of chromium, and about 29% to about 80% by weight of nickel. It should be noted that, the more content of the nickel is, the higher electrical resistivity and higher heat resistance the nickel-chromium alloy has. In one embodiment, the metal heating wire is made of $Cr_{20}Ni_{80}$, which has an electrical resistivity of about $(1.14\pm0.05)\times10^{-6}$ $\Omega*m$ and a highest using temperature of about 1200 degrees Celsius.

In some embodiments, there may be a certain requirement for a sectional area of the metal heating wire when a large current passes through the metal heating wire. For example, the large current and the sectional area may be determined according to a ratio of $100^2(A^2):1.131$ $(mm^2)$, that is, if the large current is about 100 A, the sectional area of the metal heating wire should be no less than about 1.131 $mm^2$. In one embodiment, the large current is 500 A, and a cylinder metal heating wire having a diameter of about 6 mm and a sectional area of about 28.27 $mm^2$ is selected. Also, a resistance of the metal heating wire is determined according to a voltage (V) and a heating current (I) of the battery group 1, for example, according to a formula of $I=V/(R+r)$, in which r represents the resistance of the battery group 1, and R represents the resistance of the metal heating wire. That is, R=V/I−r, and since r is decreased with the increasing of the temperature, R is increased with the increasing of the temperature. In order to make sure that the heating current I is less than 500 A, a metal heating wire having a resistance of about 480 mΩ is selected as the large-current discharge module 4.

The working process of the battery heating system according to embodiments of the present disclosure may be as follows. When an electric vehicle is to be used or charged under a low temperature, the controller of the battery heating system receives a temperature signal (namely a current temperature of the battery group 1, or battery temperature for short) from a battery management system (BMS), when the battery temperature is less than a first predetermined value T1, the controller controls the switch (IGBT) to turn on, and then the battery group 1 is heated, and when the battery temperature is greater than or equal to a second predetermined value T2, the controller controls the switch (IGBT) to turn off, and then the heating is finished.

When the electric vehicle is to be used or charged, the switch (IGBT) receives the temperature signal from the BMS. When the battery temperature is less than the first predetermined value T1 (for example, −30 degrees Celsius), the switch (IGBT) is turned on, then the battery group 1 (for example, a battery group 1 having a voltage of 500 V) discharges with a relatively large current (for example, about 400 A to about 500 A) via the metal heating wire 4 (for example, the nickel-chromium alloy heating wire 4 having a resistance of about 480 mΩ), the battery group 1 is heated due to an internal resistance thereof, and the metal heating wire 4 is cooled down by the cooling liquid (for example, a car coolant, −40 degrees Celsius). When the battery temperature is greater than or equal to the second predetermined value T2 (for example, 0 degree Celsius), the switch (IGBT) is off, then the heating is finished, in which the time for heating the battery group 1 may be controlled within 25 seconds. The first and second predetermined values T1, T2 may be defined according to actual needs, and the parameters of the metal heating wire 4 may be regulated according to the battery group 1 and the time required for heating the battery group 1. Usually, the time for heating the battery group is controlled within 30 seconds.

According to the battery heating system of the present disclosure, with the large-current discharge module, the battery group may discharge with a relatively large current, and thus the battery group may generate lots of heat within a short time due to an internal resistance thereof. That is, the battery group is heated from the inside thereof, and thus the battery group may be heated quickly. Specifically, since the discharge current is relatively large, and the battery group is heated from the inside thereof, a heating speed is high, and a heating efficiency is high, which may meet requirements of users. In addition, as a part of the battery assembly or the electric vehicle, the battery heating system may also be used to heat the battery group to a certain temperature at anytime and anywhere instead of being limited to heat the battery group before charging the battery group.

In order to efficiently utilize the heat generated from the large-current discharge module, the battery heating system may include following implementations.

1. If the battery group 1 includes a cooling system of itself, then the heated cooling liquid of the battery heating system may be supplied to the cooling system directly. Alternatively, the sealed container 5, in which the cooling liquid is received, may be disposed close to the battery group 1. In this way, after the cooling liquid in the sealed container 5 is heated by the large-current discharge module 4, the battery group 1 may be heated from the outside, thus improving a heating efficiency of the battery group 1 and further reducing the time for heating the battery group 1.

2. For a hybrid vehicle having a motor, the heated cooling liquid may also be supplied for pre-heating the motor. Alternatively, the heated cooling liquid may also be supplied to an air-conditioner system of the vehicle for heating the vehicle. For example, in some embodiments, the sealed container 5 of the battery heating system is disposed close to the air-conditioner system or the motor, then after the cooling liquid in the sealed container 5 is heated by the large-current discharge module 4, the heated cooling liquid may be utilized for pre-heating the motor or be supplied to the air-conditioner system for heating the vehicle. Therefore, an energy consumption of the motor or the air-conditioner system may be reduced.

3. If the battery group has a positive temperature coefficient (PTC) resistor, or if the air-conditioner system uses a PTC resistor for heating, then the discharge current may be shunted to the PTC resistor.

Figure 3:
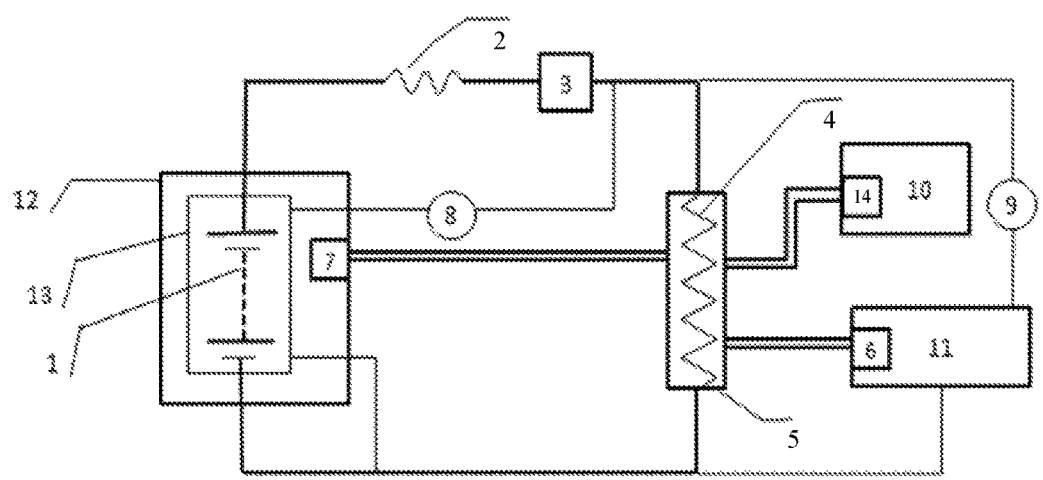
FIG. 3 is a schematic view of a battery heating system according to another embodiment of the present disclosure.

As shown in FIG. 3, the battery heating system may further include a first relay 8 and a PTC heating module 13. The PTC heating module 13 is connected with the second end of the switch 3 via the first relay 8 and is configured to heat the battery group 1 from the outside of the battery group 1 when the switch 3 is turned on. For example, the PTC heating module 13 is disposed on a surface of the battery group 1, a first end of the PTC heating module 13 is connected with the first end of the switch 3, and a second end of the PTC heating module 13 is connected with the second end of the switch 3. Then, the PTC heating module 13 may heat the battery group 1 from the outside of the battery group 1 efficiently, thus improving a heating efficiency of the battery group 1.

Specifically, when the vehicle is to be used or charged, the switch is turned on if the battery temperature is less than the first predetermined value T1 (for example, −30 degree Celsius), then the battery group 1 (500 Voltage) discharges with a relatively large current (400 A-500 A) via the metal heating wire 4 (nickel-chromium alloy heating wire, 480 mΩ), and the battery group 1 is heated due to an internal resistance thereof. In the meantime, the first relay 8 is switched on, the discharge current in the main circuit is shunted to the PTC heating module 13, such that the PTC heating module 13 heats the battery group 1 from the outside, thus increase a heating efficiency.

As shown in FIG. 3, in one embodiment, the battery heating system may further include a first pump 7 and a liquid cooling system 12. The liquid cooling system 12 is communicated with the sealed container 5 via the first pump 7, and when the first pump 7 is activated, a cooling liquid circulation is performed between the liquid cooling system 12 and the sealed container 5 so as to auxiliarily heat the battery group 1.

Specifically, after the cooling liquid (for example, car coolant, −40 degree Celsius) received in the sealed container 5 is heated by the large-current discharge module 4 (for example, the metal heating wire 4), the first pump 7 is activated, the cooling liquid in the sealed container 5 and the liquid cooling system form a convection to exchange heat. Therefore, the heating efficiency may be further improved.

According to the battery heating system of the present disclosure, with the large-current discharge module, the battery group may discharge with a relatively large current, and thus the battery group may generate lots of heat within a short time due to an internal resistance thereof. That is, the battery group is heated from the inside thereof, and thus the battery group may be heated quickly. Specifically, since the discharge current is relatively large, and the battery group is heated from the inside thereof, a heating speed is high, and a heating efficiency is high, which may meet requirements of users. In addition, the heated cooling liquid in the sealed container may be utilized for other components of the vehicle (for example, the motor cooling system, the air-conditioner system, and the liquid cooling system of the battery group), thus reducing the energy consumption while satisfying users' requirements.

As shown in FIG. 2 and FIG. 3, in one embodiment, the battery heating system may further include a fuse 2. The fuse 2 is disposed between the positive terminal of the battery group 1 and the switch 3. Therefore, the battery heating system may be prevented from being destroyed, and safety of the battery heating system may be improved.

The present disclosure also provides a battery assembly. The battery assembly includes the battery heating system mentioned above. With the battery assembly, the battery group may be quickly heated with the large discharge current at the low temperature, thus reducing a heating time and improving a heating efficiency. In addition, the battery assembly plays as a part of the vehicle, and the battery heating system may be used to heat the battery group to a certain temperature at anytime and anywhere instead of being limited to heat the battery group before charging the battery group.

The present disclosure also provides an electric vehicle. The electric vehicle includes a motor, an air-conditioner system and a battery assembly mentioned above. With the electric vehicle, the battery group may be quickly heated, thus reducing a heating time and improving a heating efficiency. If the temperature of the battery group is low before the electric vehicle is started or charged, the battery group may be quickly heated, thus saving a preparation time before the electric vehicle is started or charged. In addition, as a part of the electric vehicle, the battery heating system may be used to heat the battery group to a certain temperature at anytime and anywhere instead of being limited to heat the battery group before charging the battery group.

As shown in FIG. 3, in one embodiment, the electric vehicle may further include a second pump 14 and a motor cooling system 10. The motor cooling system 10 communicates with the sealed container 5 of the battery heating system via the second pump 14. When the second pump 14 is activated, a cooling liquid circulation is performed between the motor cooling system 10 and the sealed container 5, such that the motor cooling system may use the heated cooling liquid to pre-heat the motor. That is, when the motor is needed to be pre-heated, the second pump 14 is activated, the cooling liquid in the motor cooling system 10 and the sealed container 5 form a convection to exchange heat, thus pre-heating the motor.

As shown in FIG. 3, in one embodiment, the electric vehicle may further include a third pump 6. The air-conditioner system 11 communicates with the sealed container 5 of the battery heating system via the third pump 6. When the third pump 6 is activated, a cooling liquid circulation is performed between the air-conditioner system 11 and the sealed container 5, such that the air-conditioner system 11 utilizes the cooling liquid to heat the vehicle. In another embodiment, the electric vehicle may further include a second relay 9. A positive terminal of the air-conditioner system 11 is connected with the second end of the switch 3 via the second relay 9, and a negative terminal of the air-conditioner system 11 is connected with the negative terminal of the battery group 1. In this way, when both the switch 3 and the second replay 9 are turned on, the battery group 1 supplies power to the air-conditioner system 11.

Specifically, when the air-conditioner system 11 is activated, the second relay 9 is turned on according to a signal feedback from an air-conditioner controller, and the discharge current in the main circuit is shunted to the air-conditioner system 11. When it is needed to heat the vehicle, the third pump 6 is activated, and then the cooling liquid in the air-conditioner system 11 and the sealed container 5 form a convection to exchange heat, such that the air-conditioner system 11 utilizes the cooling liquid to heat the vehicle, thus reducing the energy consumption.

When the battery temperature is greater than or equal to the second predetermined value T2 (0 degree Celsius), the first relay 8 and the second relay 9 are turned off, the switch 3 is turned off, and the heating is finished. The time for heating the battery group 1 is controlled within 28 seconds. When temperatures of the cooling liquid in the sealed container 5, the motor cooling system 10, the air-conditioner system 11 and the liquid cooling system 12 achieve a balance, the first pump 7, the second pump 14 and the third pump 6 are deactivated. Alternatively, when any one of the motor cooling system 10, the air-conditioner system 11 and the liquid cooling system 12 needs to work alone, the corresponding pump is deactivated so as to cut off the circulating cooling liquid. That is, those systems would not influence each other.

It should be noted that other elements or structures of the electric vehicle is known by those with ordinary skills, and thus descriptions are omitted herein.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A battery heating system, comprising:
a battery group having a positive terminal and a negative terminal;
a current detecting module configured to detect a heating current of the battery group;
a switch having a first end connected with the positive terminal;
a current discharge module having a first end connected to a second end of the switch, and a second end connected to the negative terminal;
an adjustable resistor connected to the current discharge module in series;
a controller connected to the switch and configured to control the switch according to a temperature of the battery group and to adjust a resistance of the adjustable resistor so as to adjust the heating current of the battery group;
a sealed container, and
cooling liquid received in the sealed container,
wherein when the switch is turned on, the battery group discharges via the current discharge module and is heated due to an internal resistance thereof, the current discharge module and the adjustable resistor are within the cooling liquid, and the cooling liquid is configured to cool the current discharge module and the adjustable resistor.

2. The battery heating system of claim 1, wherein the sealed container is made of non-conducting material.

3. The battery heating system of claim 1, wherein the current discharge module has a discharge current of about 400 A to about 500 A.

4. The battery heating system of claim 1, wherein the current discharge module comprises a metal heating wire, and the metal heating wire comprises a nickel-chromium alloy heating wire.

5. The battery heating system of claim 4, wherein the nickel-chromium alloy heating wire has a predetermined electrical resistivity, a predetermined resistance value and a predetermined diameter.

6. The battery heating system of claim 4, wherein the metal heating wire has an electrical resistivity of about $(1.14\pm0.05)\ 10^{-6}\Omega*m$.

7. The battery heating system of claim 1, further comprising:
a first relay; and
a positive temperature coefficient heating module connected with the second end of the switch via the first relay and configured to heat the battery group from the outside of the battery group when the switch is turned on.

8. The battery heating system of claim 1, wherein the sealed container is disposed close to the battery group.

9. The battery heating system of claim 1, further comprising:
a first pump; and
a liquid cooling system communicated with the sealed container via the first pump,
wherein when the first pump is activated, a cooling liquid circulation is performed between the liquid cooling system and the sealed container so as to auxiliarily heat the battery group.

10. The battery heating system of claim 1, further comprising a fuse disposed between the positive terminal of the battery group and the switch.

11. The battery heating system of claim 1, wherein the switch comprises an insulated gate bipolar transistor.

12. A battery assembly, comprising a battery heating system according to claim 1.

13. An electric vehicle, comprising:
a motor;
an air-conditioner system; and
a battery assembly according to claim 12.

14. The electric vehicle of claim 13, wherein the sealed container of the battery heating system is disposed close to the air-conditioner system or the motor.

15. The electric vehicle of claim 13, further comprising:
a second pump; and
a motor cooling system communicated with the sealed container of the battery heating system via the second pump,
wherein when the second pump is activated, a cooling liquid circulation is performed between the motor cooling system and the sealed container so as to pre-heat the motor.

16. The electric vehicle of claim 13, further comprising a third pump, wherein the air-conditioner system is communicated with the sealed container of the battery heating system via the third pump, and wherein when the third pump is activated, a cooling liquid circulation is performed between the air-conditioner system and the sealed container such that the air-conditioner system utilizes the cooling liquid to heat the electric vehicle.

17. The electric vehicle of claim 13, further comprising a second relay, wherein a positive terminal of the air-conditioner system is connected with the second end of the switch via the second relay, and a negative terminal of the air-conditioner system is connected with the negative terminal of the battery group, and wherein when the switch and the second relay are turned on, the battery group supplies power to the air-conditioner system.

* * * * *